United States Patent
Reh et al.

[11] Patent Number: 5,579,588
[45] Date of Patent: Dec. 3, 1996

[54] METHOD FOR DOSING A PARTICULATE PHASE IN A GAS/PARTICLE FLOW IN A FLUIDIZED BED

[75] Inventors: Lothar Reh, Zumikon; Marc Tesch, Forch; Beat Häni, Zuzwil; Arthur Ruf, Schwerzenbach, all of Switzerland

[73] Assignee: Bühler AG, Uzwil, Switzerland

[21] Appl. No.: 452,180

[22] Filed: May 26, 1995

Related U.S. Application Data

[62] Division of Ser. No. 942,673, Sep. 9, 1992, Pat. No. 546,994.

[30] Foreign Application Priority Data

Sep. 9, 1991 [CH] Switzerland ............. 02 641/91-7

[51] Int. Cl.$^6$ ............................................. F26B 3/08
[52] U.S. Cl. .................. 34/359; 34/364; 34/365; 34/589
[58] Field of Search ............. 34/359, 360, 364, 34/365, 370, 576, 579, 588, 589

[56] References Cited

U.S. PATENT DOCUMENTS

| | | | |
|---|---|---|---|
| 2,468,508 | 4/1949 | Munday | 34/370 |
| 2,502,953 | 4/1950 | Jahnig | 34/370 |
| 2,581,041 | 1/1952 | Ogorzaly et al. | 34/370 |
| 2,750,681 | 6/1956 | Berry | 34/579 |
| 2,974,419 | 3/1961 | Hauk et al. | 34/364 |
| 3,599,832 | 8/1971 | Smith | 222/1 |
| 4,369,045 | 1/1983 | Vorres | 48/197 |
| 4,532,108 | 7/1985 | Becht, IV . | |
| 4,784,533 | 11/1988 | Teigen . | |
| 5,175,942 | 1/1993 | Dutta et al. | 34/364 |

FOREIGN PATENT DOCUMENTS

| | | |
|---|---|---|
| 0084887 | 8/1983 | European Pat. Off. . |
| 0308026 | 9/1988 | European Pat. Off. . |
| 41365 | 6/1980 | Japan . |
| 70008 | 8/1988 | Japan . |

OTHER PUBLICATIONS

L. S. Leing, Jones 1978 "Fluidization" Cambridge University Press Coexisteure of Fluidized Flow an Peckel Bed Flow . . . pp. 116–121.

1985 P. J. Jones et al "Fluidization", Academic Press London pp. 293–330 Chap. 8 Downflow of Solids through Pipes & Valves.

1990 D. P. O'Dea et al Powder Technology 62 pp. 291–297 "Gas–Solids Flow through the Bottom Restriction of . . .".

1978 M. Robin Judd et al the American Inst. of Chemical Engineers "The Flour of Fine, Dense Solids Down . . . ".

1971 R. J. Burkett et al Chemical Eng. Science, vol. 26 pp. 405–417 Pergamm Press GB/"On the flour of Fluidised . . . ".

1971 L. Massimilla "Fluidization" Academic Press NY Chap. 15 Flow Properties of the Fluidized Dense . . .

1957 W. Barth et al, Chemie–Ing.–Techn. 29 pp. 599–602 "Neves Verfahren zur Bestimmung . . . ".

1991 M. Tesch (thesis) "Zeitkonstantes Dosiereu Feiner Feiner Feststoffe" Zwich Diss. Eth Nv. 9593.

Primary Examiner—Henry A. Bennett
Assistant Examiner—Dinnatia Doster
Attorney, Agent, or Firm—Martin A. Farber

[57] ABSTRACT

A method for metering solid present in the gas/solid stream of a fluidized-bed apparatus, in which gas and solid are present as a prehomogenized, free-flowing mixture in a fluidized bed and in which at least one outlet orifice for removal of the gas/solid stream is provided in an outflow pipe. The method provides for feeding a particulate phase and a gas phase, homogenizing the two phases in a fluidized bed, discharging the two-phase flow via a discharge pipe and injecting gas into the discharge pipe.

27 Claims, 4 Drawing Sheets

METHOD FOR DOSING A PARTICULATE PHASE IN A GAS/PARTICLE FLOW IN A FLUIDIZED BED

RELATED APPLICATION

This application is a division of our co-pending application Ser. No. 07/942,673 filed Sep. 9, 1992 now U.S. Pat. No. 546,994.

The invention relates to a method for dosing a particulate phase present in a gas/particle flow, and to a process for dosing such a particulate phase.

The accuracy with which a predetermined particle flux is adjusted in terms of mass or volume is of considerable importance for various areas of process engineering, and the levels of the requirements differ. In the pneumatic conveying of solid particles through pipelines, for example, metering screws, rotary vane feeders or metering valves are used, in which however periodic fluctuations superposed on the outflowing solid mass flow may prove disadvantageous. In other processes too, such as, for example, the feeding of fluidized, optionally heated solid particles into a reaction space, controlled feeding is essential.

If fluid flows from bottom to top through a bed of solid particles, above a certain fluid velocity, the incipient fluidization velocity, the particles are entrained; the bed is loosened and fluidized. From the incipient fluidization point, the pressure drop above the solid particles within the bed, the so-called fluidized bed, remains essentially constant and is dependent on the volume flow of the fluid.

For various reasons, such mixing proves to be advantageous and necessary for different applications. Owing to the high values of heat and mass transfer coefficients and the high internal thermal conductivity of such a fluidized bed, fluidized particles can be used, for example, as a heat transfer medium. The solid particles borne by the gas can be passed through pipes similarly to a uniform liquid, for example into a reaction space into which the solid particles release their heat. If very small solid particles having a particle diameter of less than 100 μm are used, for example, high-temperature reactions take place within fractions of seconds.

The behavior of the gas/solid stream flowing out of the fluidized bed, the type of possible flow states with their tendency toward destabilization and measures for counteracting this have been investigated both theoretically and empirically in various publications. In particular, standpipes which permit the feeding of solid stream via outflow orifices at their lower end—in particular with a variable cross-section—and on the other hand act as a pressure barrier against the reaction vessel are used for the passage of fluidized solids from fluidized beds into reaction spaces, which are generally under a certain positive pressure. Extensive investigations (P. J. Jones, L. S. Leung, "Fluidization", Cambridge University Press, 1978; "Fluidization", Academic Press London, 1985; D. P. O'Dea, V. Rudolph, Y. O. Chong, "Powder Technology", 62 (1990) 291) have been concerned with the conditions for the occurrence of various flow states in such standpipes. The coexistence of different flow forms in a standpipe was detectable on the basis of X-ray photographs (M. R. Judd, P. D. Dixon, The American Institute of Chemical Engineers, 1978), a loosely packed bed just above the constricted outflow orifice coexisting with a flow state in which solid particle strands flow downward at high velocity. The flow field as such is therefore by no means homogeneous, and the solid particles flowing through the standpipe are no longer comparable in their properties with the fluidized solid particles of the fluidized bed. By additionally introducing air just above the outflow orifice of the standpipe, an attempt is being made—with a certain degree of success—to eliminate the danger of blockage, a measure used in particular in industrial plants, and which may lead to a gradual—or sudden—change in the flow state in the plant. However, the stability and the uniformity of a gas/solid stream flowing downward in a standpipe are thus not achieved.

Other investigations have been concerned with the question of the effect of outflow orifices or outflow nozzles out of the fluidized bed on the flow state of the gas/solid stream flowing out of a fluidized bed. Thus, when such an orifice is approached in a fluidized bed, the porosity is supposed to decrease and the flow state of the gas/solid stream before and after the orifice will differ. Furthermore, a greater proportion of gas will be found in the outflowing gas/solid stream (R. J. Burkett, P. Chalmers-Dixon, P. J. Morris, D. L. Pyle, Chemical Engineering Science, 1971, Vol. 26, 405). The mass flow of the solid particles flowing through an orifice in the fluidized-bed apparatus depends not only on the particle properties but also essentially on the height of the fluidized bed above the orifice and the diameter thereof and, up to a certain orifice diameter, is independent of the velocity of 6he fluidizing gas. If the gas/solid stream does not flow through simple orifices of the fluidized-bed apparatus but through nozzles, the proportion of gas in the gas/solid stream depends on the ratio of the diameter of the nozzle to its length (L. Massimilla, "Fluidization", Academic Press, New York, 1971).

In the case of combustion, gasification and chemical gas/solid reactions of finely divided solids, use is advantageously made of the fluidized-bed technique since this is characterized by optimally adjustable reaction conditions due to temperature constancy.

To be able to ensure controlled feeding of the solid particles into the reaction spaces, steady-state metering and homogeneous mixing are preconditions. Measures which permit constant metering as a function of time with preservation of the homogeneity of the gas/solid stream are of decisive importance for this reason.

EP-A1-84 887 describes a flow controller for solids which flow out of the fluidized-bed apparatus and through a standpipe into a solids consumer. Here, a pressure medium is passed into a control hopper coordinated with a standpipe and having a plenum chamber; the resulting pressure difference between the control hopper and the solids consumer determines the throughput of solid. At the lower end of the standpipe or of the control hopper, a bed of solid is formed. The solid fed into the solids consumer thus cannot be compared, either with respect to its flow behavior or with respect to its properties, with the homogeneous gas/solid stream flowing out of a fluidized bed.

It is the object of the invention to provide an apparatus and process which ensure high accuracy of dosing even in the case of large solid mass flows in conjunction with small metering fluctuations over both long and very short periods. The uniform distribution, in terms of time and space, of solid particles in the emerging gas/solid stream is thus ensured. Advantageous further embodiments are described in the defining features of the dependent claims.

The investigations cited above and concerned with flow states in standpipes have clearly shown that the inhomogeneities and instabilities occurring there are influenced to a great extent by the entry situation and the conditions prevailing there. It is also disclosed there that the height of the fluidized bed and cross-section of the outlet orifice in the fluidized-bed apparatus may influence the outflowing mass flow. However, concentric restriction of the cross-section of the outflow orifice by mechanical shutters or other membranes does not by any means ensure homogeneity of the outflowing gas/solid stream. Furthermore, such shutters tend to cause abrasion and can result in blockages above the constriction. It is evident that metering concepts which are based on these principles are relatively sluggish and can by no means meet the above-mentioned requirements for very short reaction times. However, it is also impossible to influence the homogeneity of the outflowing gas/solid stream by means of one of these methods.

According to the invention, outlet nozzles are coordinated with the outflow orifice, and/or at least one means for influencing the prehomogenization, i.e. the gas/solid fluidized bed, is provided.

If the outlet nozzle is formed as a hollow body which is adjacent to the outlet orifice, has an at least partially gas-permeable wall and is at least partially coaxially surrounded by a gas flow channel, both the throughput of the solid and the homogeneity of the outflowing gas/solid stream can be adjusted in this manner which allows the solid mass flow to be influenced directly in the nozzle. Preferably, this hollow body connects at right angles directly to the outlet orifice and is cylindrical. The walls of the hollow body may be porous, preferably consist of sintered material and/or be provided with holes in order to permit additional radial introduction of gas into the gas/solid stream flowing out of the fluidized bed, in the region of the hollow body and hence directly coordinated with the outlet orifice. Holes inclined obliquely downward, in particular at an angle of 5° to 15°, prevent penetration of solid particles on the one hand but nevertheless ensure adequate radial introduction of gas on the other hand.

Although small cross-sectional areas of the outlet orifice are advantageous for the homogeneity of the outflowing gas/solid stream, this fact is however generally in contradiction to the requirements for cost-efficiency of a process. In contrast, the process according to the invention permits the use of economically meaningful outlet cross-sections, i.e. of high solid throughput in conjunction with homogeneity of the gas/solid stream. For certain applications, a further increase in the mass throughput can be achieved by a plurality of outlet orifices in the bottom of the fluidized-bed apparatus. In order to avoid reducing the stability of the fluidized bed, the sum of the cross-sectional areas of all hollow bodies at the coordinated outlet orifices should be about 0.2 to 2 percent of the base area of the fluidized-bed apparatus. Furthermore, for the same reason the plurality of outlet orifices should be centrosymmetric and, depending on their particular diameter, should be a distance away from one another. In the case of elongated fluidized beds, this permits arrangement in a row, in which the mutual spacing should correspond approximately to the distance of the outlet orifice row from a side wall of the fluidized-bed apparatus. If the base area of the fluidized-bed apparatus is circular or square, for stability reasons it is advisable to arrange the plurality of outlet orifices preferably approximately in the center, and the mutual spacing of the outlet orifices should correspond at least to the diameter of each outlet orifice.

In order to keep the effect of the entry zone in the outlet orifice on the stability of the fluidized bed as small as possible, the height of the fluidized bed should be at least equal to three times the diameter of the outlet orifice, preferably ten to fifteen times as great. A greater fluidized-bed height—or a larger fluidized-bed diameter—moreover has a regulatory effect in respect of possible fluctuations, which must always be expected when feeding solid particles into the fluidized bed.

Of course, each of these measures by themselves, but in particular in combination, result in an advantageous buffer effect of the fluidized bed with respect to metering fluctuations of the solid fed into the fluidized-bed apparatus.

The height of the fluidized bed can be adjusted or corrected by measuring the pressure difference. Alternatively, a level sensor may also be provided. Coarse regulation can thus be effected through adjustment of the preliminary pressure above the fluidized bed, for example in the case of large deviations of the solid mass flow measured in the outflow pipe. This is also possible by regulation of the amount of solid particles fed into the fluidized-bed apparatus and/or by regulation of the pressure prevailing above the fluidized bed.

The resulting possible combination of two measures for regulating the solid mass throughput at different rates, namely on the one hand through the additional gas introduction in the region of the hollow body directly in the region of the outlet orifice (extremely rapid) and on the other hand through controlling the level of the fluidized bed and of the gas pressure above this (sluggish), extends the regulation range and provides improved regulation characteristics.

If at least one fluidization nozzle, but, for symmetry reasons, preferably at least two fluidization nozzles, is or are coordinated with the outlet orifice, which nozzle or nozzles enters or enter the fluidized-bed apparatus directly adjacent to the outlet orifice, this separate aeration at the outlet orifice breaks bridges in the bed material during start-up and prevents the intake of bubbles into the intake orifice during operation, and aeration should be as slight as possible for this purpose. If such a fluidization nozzle in the form of an annular channel around the outlet orifice is formed, this ensures particularly uniform aeration of the region around said orifice, particularly when this fluidization nozzle consists at least partly of a porous material through which fluidization takes place. Although this does not have a considerable effect on the outflowing solid mass flow through such fluidization nozzles, the homogeneity of the fluidized bed in the entry region into the outlet orifice is improved.

In terms of process engineering, the amount of gas flowing into the fluidized-bed apparatus and fluidizing the solid particles should be controlled so that, when the fluidized bed has slightly expanded, operation preferably takes place close to the incipient fluidization point, in particular in the range from 0.95 to 2 times the incipient fluidization velocity.

In this way, the danger of bubble formation or channel formation and hence the tendency toward instability of the fluidized bed are substantially ruled out.

In order to ensure short reaction times, especially in high temperature reactions, a mean particle diameter of the solid particles should be no greater than 200 μm, preferably no greater than 100 μm, and should be essentially the same for all solid particles, i.e. should have a narrow particle diameter distribution.

If the bottom of the fluidized-bed apparatus consists of highly porous material, only very small bubbles can form above the bottom of the fluidized-bed apparatus and the fluidizing gas passes through, and the gas flows uniformly into the fluidized bed, with the result that possible cores of instability can be avoided. A further measure for increasing the homogenization comprises making the bottom of the fluidized-bed apparatus capable of vibration so that it can be caused to vibrate. Alternatively or additionally, the gas itself flowing through can be caused to vibrate by a pulsation means.

In the applications considered for such an apparatus according to the invention, for example in the petroleum industry, in calcination, gasification and pyrolysis processes or catalytic cracking processes, there is a necessity for the fluidized-bed apparatus and outlet nozzles to be pressure-resistant, preferably up to 80 bar when used for coal gasification, and, for use at higher temperatures—temperatures above 1000° C. are possible, for example in the calcination industry—in particular ceramic materials (sintered ceramic for the hollow body) should be used, if necessary only as lining material.

To determine the throughput of the solid in the outlet pipe and at the same time to obtain short reaction times for the correction of fluctuations, such a measuring means is arranged as far as possible in the region of the outlet orifice.

The determination of the solid mass flow required in the air stream was investigated by measurement of the pressure difference by means of a convergent-diverting measuring nozzle for small solid concentrations with negligible concentration fluctuations (W. Barth, R. Nagel, K. van Waveren, Chemie-Ing.-Techn., 29 (1957), 599). This method of measurement has the disadvantage that separation is possible at low velocities and high loadings. The solid mass flow is determined via two measurements of pressure difference, making the measurement more complex. It is also necessary to accept a certain pressure loss.

On the other hand, pressure difference methods are distinguished by very high sensitivity and are therefore used according to the invention.

If the principle of pressure difference measurement is realised by means of pressure measurement points coordinated directly with the hollow body and arranged just above the bottom of the fluidized-bed apparatus, this one measurement is surprisingly sufficient for obtaining the solid mass flow. Moreover, pressure sensors have very short response times, with the result that the measurement times are significantly shortened. Piezoresistive pressure sensors are preferably used for this purpose. Owing to the low solid velocity at the entrance of the fluidized bed outflow, the danger of erosion is reduced. This method of measurement also has the advantage that there is no need to accept any pressure loss. If the pressure measurement coordinated with the hollow body is positioned just below the nozzle entrance and just above the gas-permeable wall or the hole(s) in the wall of the hollow body, the dead times between entry of the solid into the outer orifice and into the hollow body, measurement of the solid mass flow and the effect on the solid mass flow through gas introduction are reduced to a few milliseconds. Previously impossible control times of fractions of a second are thus readily feasible.

In this way, it is possible to determine the solid mass throughput. However, to increase the speed of measurement, it is possible in addition to provide a further pressure measurement point with a pressure sensor in the region of the hollow body, making it possible to determine the fluctuations in the solid mass flow.

The outflowing solid mass flow can if necessary also be controlled if a measuring means for determining the solid mass flow is provided in the outflow pipe, as far as possible directly adjacent to the hollow body, and, via a control means, controls the gas introduction into the gas/solid stream above the hollow body. Such control is preferred for certain applications, even though the metering unit as such is more complex.

According to the invention, the measures relate to the establishment of a time-constant outflowing solid mass flow and to the establishment of the homogeneity of the gas/solid flow, particularly in the immediate vicinity of the outlet orifice, either inside the fluidized bed or in the hollow body directly adjacent to the outlet orifice. The resulting stability and uniformity of the outflowing gas/solid stream is maintained if said stream is surrounded by gas, essentially immediately after flowing through the hollow body. This is preferably effected by means of a nozzle, particularly an annular nozzle, which feeds gas coaxially and in the direction of flow of the gas/solid stream, and the gas velocity should as far as possible be equal to the flow velocity of the gas/solid stream.

The invention is described below by way of example, with reference to drawings.

Figure 1:
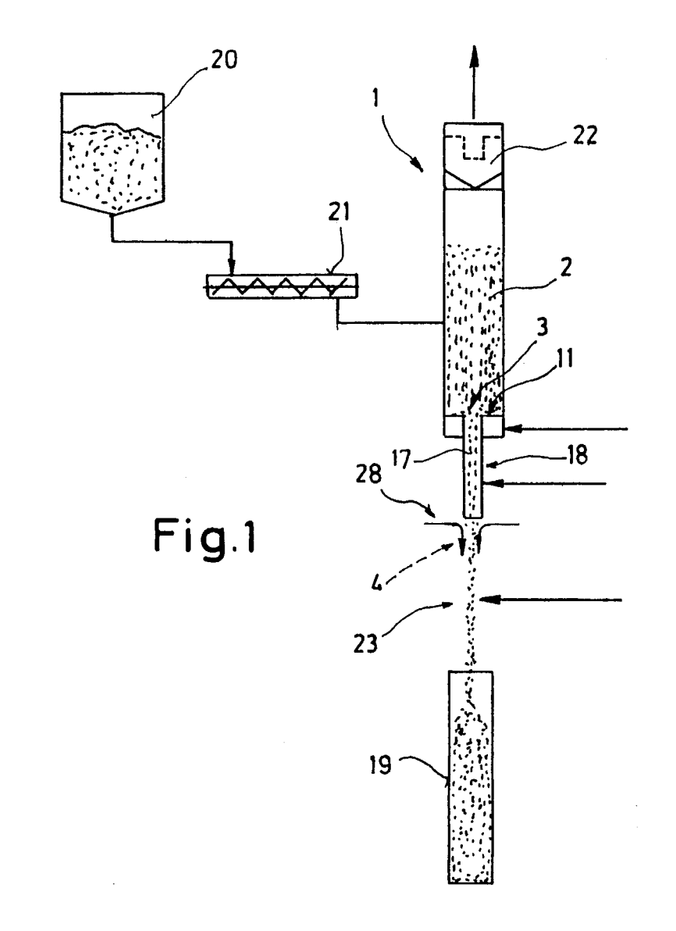
FIG. 1 shows a basic diagram of an arrangement having a fluidized-bed apparatus and a metering device according to the invention.

FIG. 1 shows, in schematic form, the principle according to the invention, according to which a gas/solid stream 17 flowing out of a fluidized-bed apparatus 1 is introduced into a reaction space 19 via a metering means 18. The solid, in the form of particles whose diameter is generally chosen to be smaller than 100 μm with regard to the reactions and in particular reaction times desired in the reaction space 19, is fed from a storage container 20 via a metering screw 21 into the fluidized-bed apparatus 1. A loosening means (not shown) provided in the outflow region of the storage container 20 ensures uniform outflow of the solid particles, even with different heights of the contents in the storage container 20.

A metering screw 21 is formed as a hollow spiral to ensure that the particles are conveyed as gently as possible. The speed of the metering screw 21 and the position of feeding in the solid particles are chosen so that the pulse of the solid particles fed from the metering screw 21 into the fluidized bed 2 can be neglected.

Fluidizing gas G flows from bottom to top through the bottom 11 of the fluidized-bed apparatus 1 and fluidizes the solid particles fed in, with formation of a fluidized bed 2. As the inflow velocity of the gas increases, the bed is increasingly loosened so that the solid particles in this two-phase system can move over smaller or greater distances. Above a certain inflow velocity, at which a fixed bed becomes a fluidized bed (incipient fluidization point), the pressure drop in the bed is virtually constant.

In theory, the fluidized bed region extends from the lower limiting velocity, the incipient fluidization velocity, to an upper limiting velocity, which can be characterized by the fact that the bed has been loosened to such an extent that each individual particle is suspended in the fluid stream without being influenced by an adjacent particle. This fluidized bed region can be divided into two parts, a homogeneous and an inhomogeneous part. Low inflow velocities of the fluidizing gas are associated with the homogeneous fluidized bed and accordingly high inflow velocities with the Inhomogeneous fluidized bed. The void content of homogeneous fluidized beds is constant as a function of time and space, in contrast to the inhomogeneous fluidized bed, in which this content is subject to pronounced fluctuations as a function of space and time, and bubbles or even channels form between particle agglomerations. Strictly speaking, homogeneous fluidized beds form only on fluidization with a liquid; fluidization of the gas always results in the formation of bubbles, which become larger toward the upper limit of the fluidized bed. However, in the region of the outlet orifice, as in the Example according to the invention, in which gas is used for fluidization, sufficient homogeneity can be expected, particularly owing to the measures according to the invention.

If the fluidized solid is to be metered constantly as a function of time from such a fluidized bed 2, this can usefully be effected only from a homogeneous fluidized bed region. This is because only then are the solid particles uniformly distributed in the fluidized bed volume to be removed; in the ideal case, there are no binding forces between the particles. A spherical shape of the particles on the one hand and uniform size on the other are advantageous. In the case of very different particle sizes, separation may occur, the smallest particles collecting close to the free surface of the fluidized bed 2 and being discharged at inflow velocities which exceed the fluidizing velocity. In practice, there will always be a certain amount of fine liberation particles, which can be separated off by means of a dust filter arrangement 22 and if necessary be immediately recycled. A substantially constant particle distribution is thus achieved in the fluidized bed 2 over long periods.

The gas/solid mixture of the fluidized bed 2 behaves substantially like a liquid; the gas/solid stream 17 which is present in homogeneous form in the fluidized bed 2 can "flow out" via an outlet orifice 3 in the bottom 11 of the fluidized-bed apparatus 1 into the outflow pipe 4 and, for example after the introduction of gas in the mixing part 23, can be introduced into the reaction space 19.

As stated in the introduction, the advantageous properties, in particular with respect to mass transfer and heat transfer and optimal mass ratios of the reactants, can be used to simplify and to accelerate many processes. This is of course possible only when structural properties are maintained in the outflowing gas/solid stream. Thus, as discussed in the introduction, the object is not only quantitatively to meter the solid present in the outflowing gas/solid stream but also to maintain and even increase the homogeneity of the gas/solid stream, i.e. to fulfill a qualitative condition.

According to the invention, this is effected by a metering means 18 shown only symbolically in FIG. 1. A nozzle 28 which in particular is annular and feeds gas coaxially with the outflowing gas/solid stream, i.e. "surrounds" said stream, is provided adjacent to said metering means. The stability of the gas/solid stream achieved by the metering means 18 is thus maintained. To avoid as far as possible any perturbation of the gas/solid stream, this gas feed should take place parallel to the direction of flow, in particular in annular form—although symmetrically arranged, individual nozzles will also be possible—and the velocity of the surrounding gas fed in should be essentially identical to the velocity of the gas/solid stream.

Figure 2:
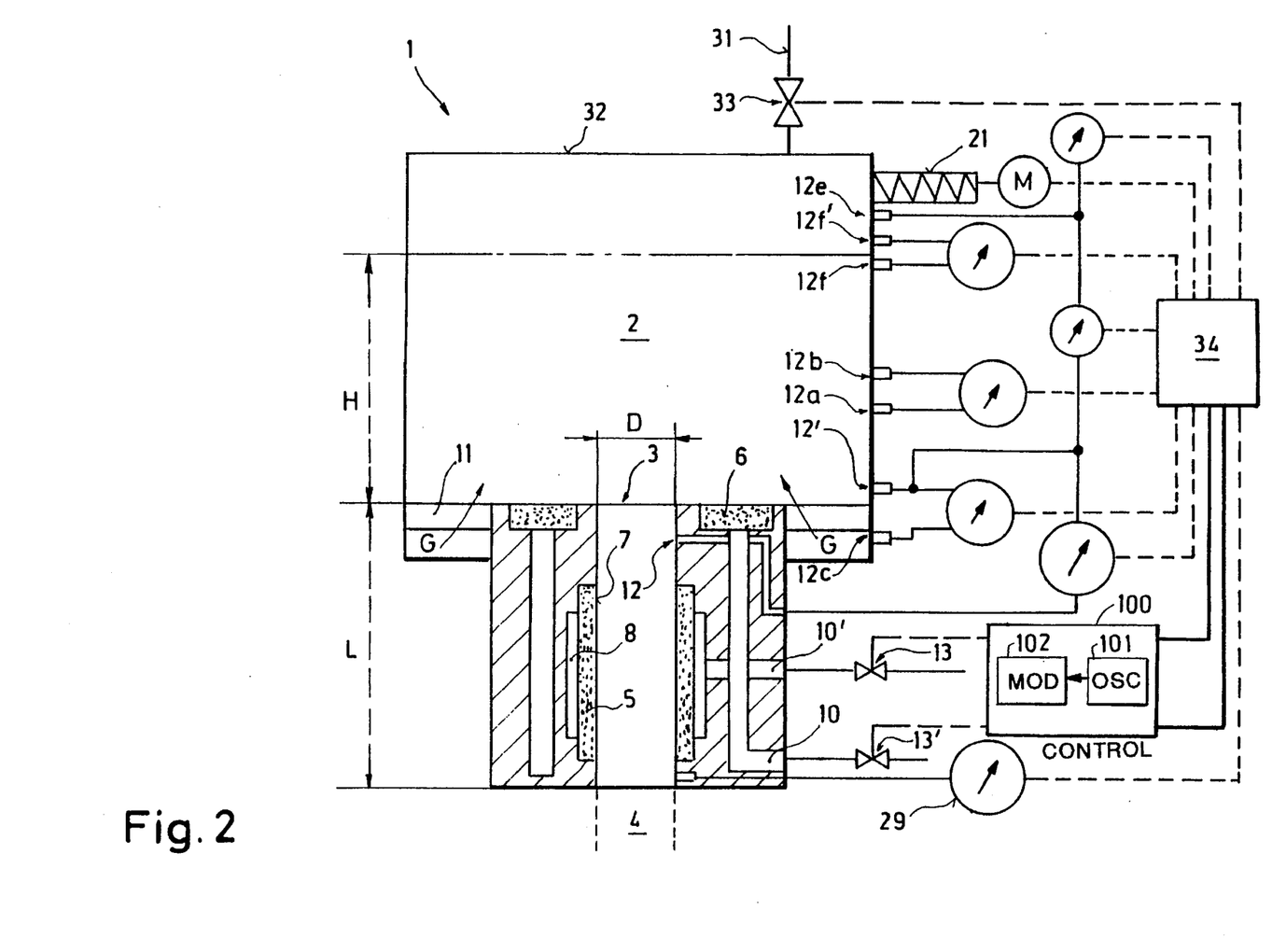
FIG. 2 shows a section through a fluidized-bed apparatus having an outlet orifice.

The function of the metering means 18 is illustrated by a possible embodiment shown in FIG. 2. The outlet orifice 3 arranged centrally in the bottom 11 of the fluidized-bed apparatus 1 and having a diameter D is coordinated with the outflow pipe 4. The gas/solid stream 17 (FIG. 1) flows through said pipe out of the fluidized bed 2. A fluidizing nozzle 6 is arranged symmetrically to the outlet orifice 3, through which fluidizing nozzle fluidizing gas is introduced into the fluidized bed 2 via a pneumatic pipe 10, in addition to the gas (arrow G) flowing through the bottom 11 of the fluidized-bed apparatus 1. Here, the fluidizing nozzle 6 is in the form of an annular channel having a porous insert, with the result that fluidization can additionally be effected concentrically in the outlet orifice 3. As a result, it is possible to counteract to a certain extent, even if not completely, the formation of instabilities which are characteristic of the entry zone. It has also been found that the drawing of bubbles into the outflow pipe 4 can be inhibited in this way. (The velocity of the gas additionally fed in via the fluidizing nozzle 6 should therefore be smaller than the velocity of the gas flowing through the bottom 11 of the fluidized-bed apparatus 1.) Solid bridges which preferentially form precisely in the region of the outlet orifice 3 can thus be broken up. Essentially, however, only a contribution toward homogenization of the gas/solid stream flowing out in outflow pipe 4 can be made by means of such fluidizing nozzles 6; hence, the solid mass flow can be influenced only to a very small extent, since bubbles would then be likely to be drawn in.

If, however, a hollow body 5, in the embodiment shown, for example, in FIG. 2, is provided as far as possible directly adjacent to the outlet orifice 3, time-constant, bubble-free metering of this solid mass throughput can be achieved. This cylindrical hollow body 5 has a porous wall 7, which in turn is surrounded by an annular gas introduction channel 8. This is likewise fed with fluidizing gas via a pneumatic pipe 10', which may be connected by the pneumatic pipe 10 to the fluidizing nozzles 6, and valves 13, 13', if necessary also directional valves and/or pressure relief valves, may be provided. A pressure measuring point 12 is arranged as close as possible to the outlet orifice 3 in the wall 7 of the hollow body 5, by means of which pressure measuring point, together with a pressure measuring point 12' arranged close to the bottom 11 of the fluidized-bed apparatus 1, the pressure difference between the fluidized bed 2 in the region of the bottom and the outlet pipe 4 close to the outlet orifice 3 is determined, and if necessary a piezoresistive differential pressure sensor or two individual piezoresistive pressure sensors can be provided for this purpose. By positioning the pressure measuring points 12, 12' in this way, the dead time between the entry of the solid into the outlet orifice 3, the measurement of the solid mass flow at the pressure measurement points 12, 12' and the effect on the solid mass flow with regard to throughput and homogeneity is minimized.

The measured data available from the pressure difference measurement are fed, for example, via a programmable logic controller 34 having an integral software regulator, which in turn controls the fluidization of the outflowing gas/solid stream and/or gas introduction into the outflowing gas/solid stream via the gas introduction channel 8 and/or the fluidizing nozzle(s) 6.

Control of the outflowing solid mass flow can be effected via a measuring means 29 for determining the solid mass flow in a region of the outflow pipe 4 which is directly adjacent to the hollow body 5. These measured data are likewise fed via a programmable logic controller 34, which in turn controls the fluidization of the outflowing gas/solid flow and/or gas introduction into the outflowing gas/solid flow via the gas introduction channel 8 and/or the fluidizing nozzle(s) 6. The solid mass flow can be determined over a delay zone by two pressure difference measurements or another contactless measuring means.

The amount of additional fluidizing gas which has to be added to influence the solid mass throughput is less than 0.1% of the solid mass throughput, with the result that extremely short regulation and control times of less than 100 milliseconds are possible.

Since, as described above, the quality of metering of the outflowing solid is determined to a very substantial extent also by the homogeneity of the outflowing gas/solid stream, possible instability sources must be eliminated by appropriate measures in the fluidized bed 2 itself. Thus, the instability limit can be increased, for example, by an advantageous embodiment of the bottom 11 of the fluidized bed. If, for example, highly porous sintered bottoms having an average pore diameter of 25 μm and a base thickness of about 20 mm are chosen, fluid flows in a finely divided form into the fluidized bed. Fluidized bed bottoms 11 which are capable of vibration and which may be caused to vibrate by a pulse generator support this process. The use of stirrers is also possible. Fluidizing gas which pulsates by flowing in through the bottom 11 of the fluidized-bed apparatus 1 likewise improves the homogenization of the fluidized bed 2, possibly in addition to the measures described.

The region of the entry zone, which is not unproblematic, is governed by the ratio of the diameter D of the outlet orifice 3 to the height H and/or the bottom area of the fluidized bed 2, assuming a constant fluidization velocity. Thus, a ratio of D:H of 1:2 proves to be the minimum requirement. The greater the height H of the fluidized bed—and hence the solid content—compared with the diameter D of the outlet orifice 3, the better is the homogeneity of the fluidized bed 2 and hence the prehomogenization of the gas/solid stream.

Greater heights H of the fluidized bed furthermore have a damping effect on vibrations which result from the feeding of the solid particles into the fluidized bed via, for example, a metering screw 21.

The ratio of metering fluctuations of the solid mass flow $\hat{m}_{ss}$ fed into a fluidized bed 2 via a metering screw 21 to metering fluctuations of a solid mass flow $\hat{m}_{SD}$ emerging via a hollow body 5 can be represented by the relationship:

$$\frac{m_{SS}}{m_{SD}} = \frac{2(H+L)\pi f \rho_S (1-\epsilon_{WS}) A_{WS}}{m_S} - 1 \quad (1)$$

where H is the height of the fluidized bed, L is the length of the hollow body 5, $\epsilon_{WS}$ is the porosity of the fluidized bed, Aws is the area of the fluidized bed, $\rho_S$ is the density of the solid, f is the speed of the metering screw and $m_S$ is the mean solid mass flow emerging from the outlet orifice 3. (Thesis of M. Tesch: "Zeitkonstantes Dosieren feiner Feststoffe" [Time-constant mastering of fine solids], 1991)

The provision/of further pressure measuring points 12a to 12c permits on the one hand monitoring of the porosity and homogeneity of the fluidized bed 2 via measurement of the pressure difference within the fluidized bed 2 (12a and 12b). On the other hand, a pressure loss above the bottom 11 can be measured via the pressure measuring points 12' and 12c which are arranged just above and just below the bottom 11 of the fluidized-bed apparatus 1, so that possible blockages of the porous bottom 11 can be detected in good time. A further pressure measuring point 12e may additionally be provided above the fluidized bed 2, for monitoring the solids content of the fluidized bed 2. Measurements of the pressure difference are advantageously made here too.

To prevent a fine solid from the fluidized bed 2 from settling on membranes of the pressure sensors, small, fine, porous plastic filters are preferably provided, or penetration of solid particles is avoided by flushing the pressure pipe with gas.

Figure 3A:
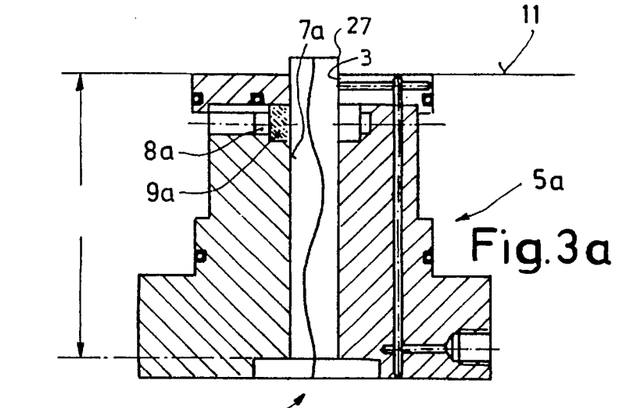
FIG. 3a and 3b show different embodiments of hollow bodies according to the invention, in two part sections in each case.
Figure 3B:
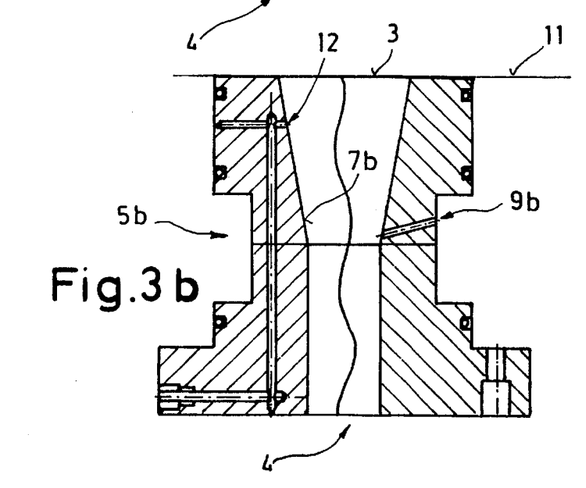

Measured data based on measurements of the homogeneity in the fluidized bed 2 can serve for regulating the homogenization of the fluidized bed 2 on the one hand and of the outflowing gas/solid stream on the other hand, both via adjustment of the inflow velocity of the fluidizing gas and via the introduction of additional fluidizing gas, either through the fluidizing nozzles 6 and in particular through the porous walls 7 or through holes 9 in this wall (FIG. 3a and 3b).

In the event of large deviations of the solid mass flow, a correction is not possible by additional gas introduction alone. As described above, coarse regulation may be effected via the height H of the fluidized bed 2 or, with constant height H, via an increase or reduction in the pressure above the fluidized bed 2. The height H of the fluidized bed 2 is kept constant via a level sensor 12f, 12f' which, via the programmable logic controller 34, controls the feed of solid by the metering screw 21, while the measured data obtained at the two pressure measuring points 12 and 12' determine the pressure in the space above the fluidized bed 2 via the programmable logic controller 34. In the space above the fluidized bed 2, the pressure is controlled by the pneumatic pipe 31 and the control valve 33, the latter connecting with the logic controller 34 as shown in FIG. 2. A pneumatic pipe 31 which enters the cover 32 of the fluidized-bed apparatus 1 and whose valve 33 is controlled is provided for this purpose. The pressure measuring point 12e may be provided above the fluidized bed 2 for monitoring the pressure or, instead of the level sensor 12f, 12f', for regulating the solid fed in via the metering screw 21.

A plurality of regulating or control mechanisms, the combination or special use of which result in a large control range and excellent flow characteristics, are thus available for achieving the desired accuracy and rapidness of metering.

Regulations and controls which take place via the fluidized bed are of course sluggish and, for the applications mentioned at the outset, determine only the control range itself.

Figure 4:
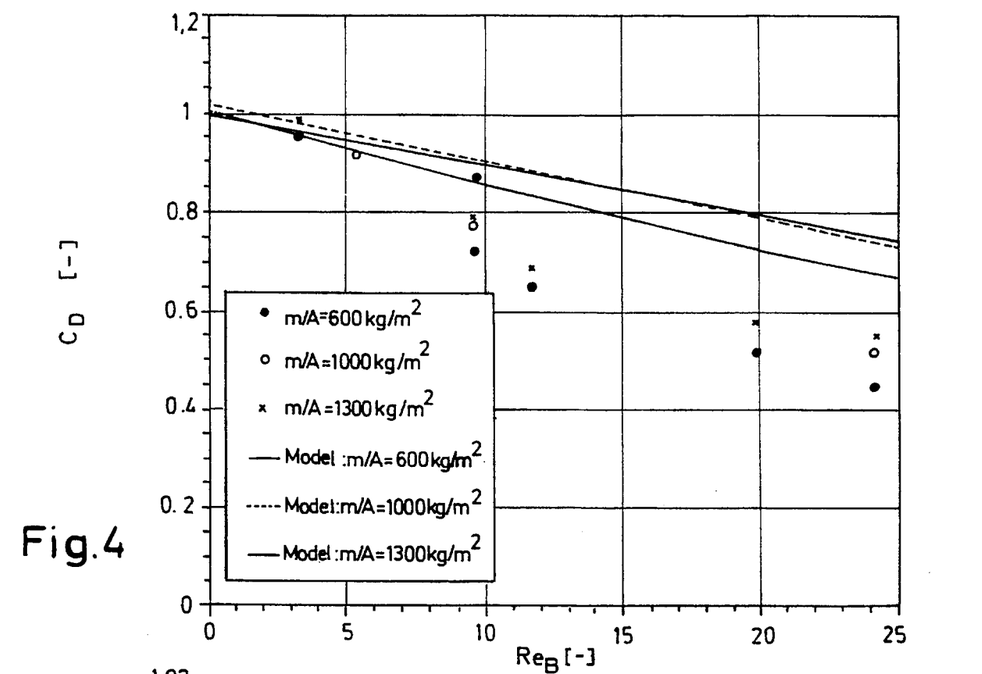
FIG. 4 shows the dependence of the solid mass flow on the additional gas introduction.

The fact that parameters such as the diameter D of the hollow body, the length L of the hollow body or the area A of the fluidized bed determine the flow state of the gas/solid stream flowing out into the outflow pipe 4 has become known from the investigations mentioned at the outset and is also evident from equation (1).

FIGS. 3a and 3b show alternative embodiments of the metering means 18 of FIG. 1. According to FIG. 3a, it has a cylindrical internal diameter; introduction if gas into the gas/solid stream takes place via a narrow, annular sintered insert 9a, which in turn is surrounded by a gas introduction channel 8a. A pressure measuring hole defining the pressure measuring point 12 is provided close to the outlet orifice 3 an example in the placement of the pressure measuring point 12 being shown in FIG. 3b. In this case, no fluidizing nozzles 6 (FIG. 2) are provided. An outer edge 27 around the outlet orifice 3 prevents bubbles from being drawn into the outflow pipe 4.

The outflow pipe 4 generally has a larger diameter than the hollow body, as is also evident from FIG. 3a. The stabilization and homogenization effected via the metering means 18 according to the invention (FIG. 1 and 2) is also maintained in the outflow pipe 4 if the gas/solid stream is surrounded by a fluid jacket, as is possible by coaxial gas introduction via the nozzle 28 (FIG. 1) just above the metering means 18.

Bubbles are substantially prevented from rising in the direction of the fluidized bed and adversely affecting the homogeneity, even when relatively large amounts of gas are introduced via the holes 9b, by the slightly convergent inflow region of the hollow body 5b of FIG. 3b and by the arrangement of gas introduction holes 9b in the transition region to the cylindrical internal diameter of the hollow body 5b, these holes 9b being slightly inclined from the horizontal toward outflow pipe 4. Here too, the pressure measuring point 12 is preferably close to the outlet orifice 3.

FIG. 4 shows the effect of gas introduction on the solid mass flow by way of example. The extent to which the solid mass flow decreases with increasing air introduction is shown in dimensionless form for a diameter of 20 mm for the outlet orifice 3 and for glass spheres having a mean particle diameter of 74 μm. A sudden decrease in the solid mass flow at a Reynold's number of $Re_B=9$ is evident. From this Reynold's number onward, the jet becomes unstable. Here, homogeneous, steady-state metering functions only up to a Reynold's number of 9. The coefficient of discharge $c_D$ is obtained from the theoretical discharge equation for the solid jet:

$$c_D = \frac{m_S}{\rho_P(1-\epsilon_{wS})A_D\sqrt{g(H+L)}} \quad (2)$$

where $m_S$ is the measured solid mass flow, $\rho_p$ is the particle density, $\epsilon_{wS}$ is the mean porosity of the fluidized bed, $A_D$ is the cross-section of the hollow body, g is the gravitational constant, H is the height of the fluidized bed and L is the length of the hollow body. (Thesis of M8. Tesch "Zeitkonstantes Dosieren feiner Feststoffe" [Time-constant metering of fine solids], 1991)

$Re_B$, the Reynold's number, is defined in terms of the empty pipe air velocity $$u_{1b}\left(\frac{V_B}{A_D}\right)$$

of the additionally fed in gas in the nozzle and the particle diameter $d_p$ as in the case of fluidized beds, where $V_B$ is the gas volume flow of the gas introduced.

$$Re_B = \frac{V_B \cdot d_P}{A_D \cdot v} , \quad (3)$$

Figure 5:
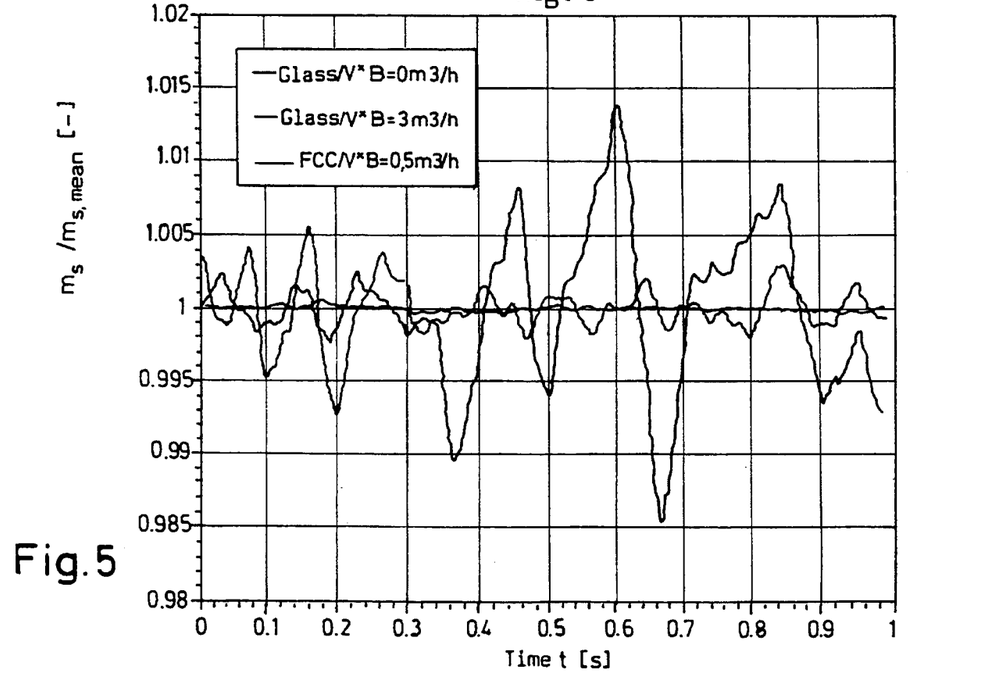
FIG. 5 shows metering fluctuations on emergence of a gas/solid jet from a fluidized bed and FIG. 6 shows an arrangement for loading a plurality of reaction spaces.

FIG. 5 shows metering fluctuations such as those which occur on emergence of the gas/solid stream from an experimental fluidized bed on the pilot scale in the case of fluidization just above the incipient fluidization point, atmospheric pressure above the fluidized bed and a 1 m high fluidized bed. In the stable region of the jet, the short-term metering fluctuations are below 0.05% for glass spheres and below 0.6% for fluid cracking catalyst. This may be compared with the unsuitable metering fluctuations of the unstable jet for glass spheres. Metering fluctuations up to a frequency of about 30 Hz were measured with a piezo differential pressure sensor.

Figure 6:
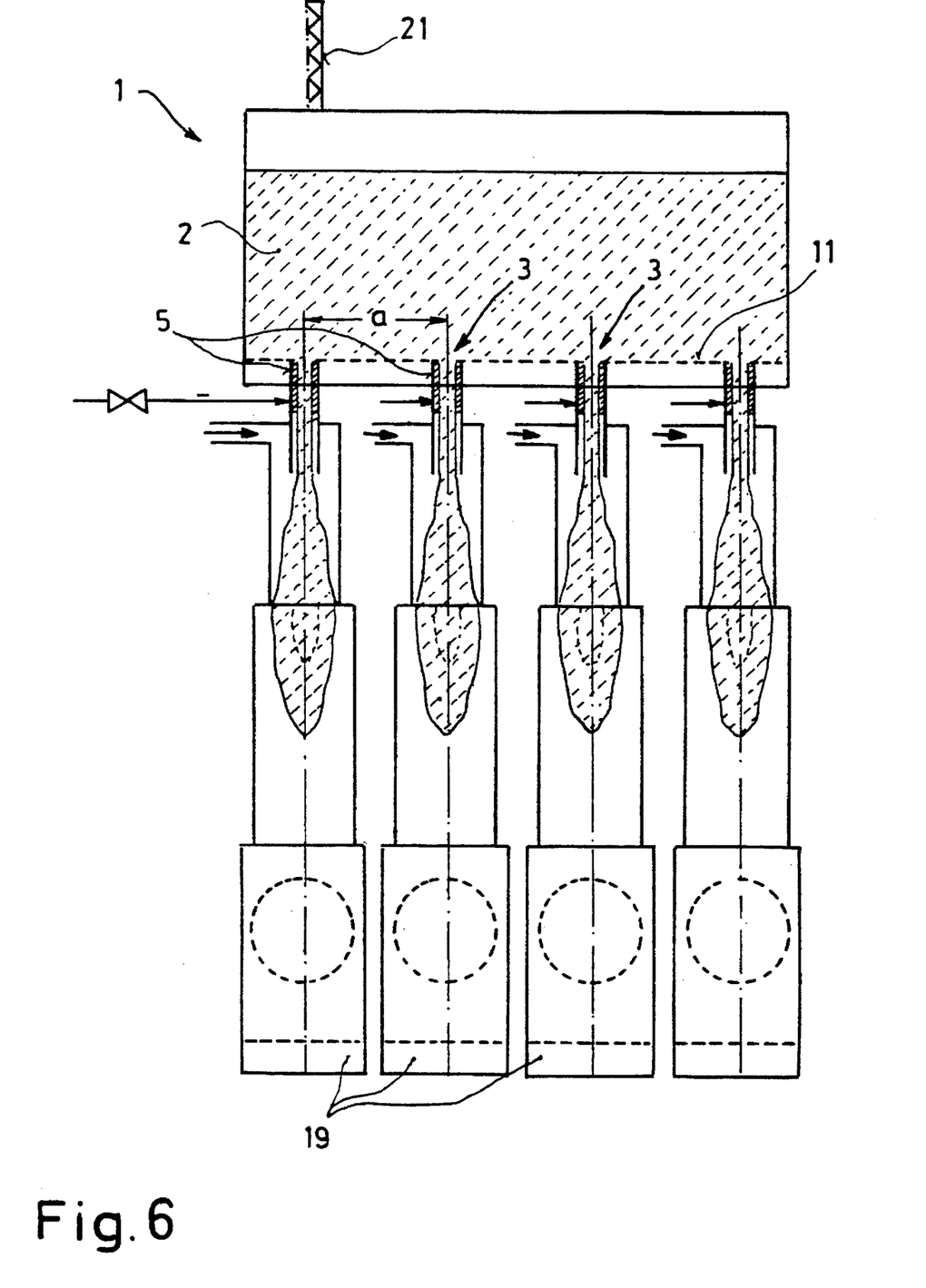

FIG. 6 shows, by way of example, the loading of a plurality of reaction spaces 19, a gas/liquid stream being taken off from a fluidized bed 2 via a plurality of outflow orifices 3. A hollow body 5 is coordinated with each of these outflow orifices 3, via which hollow body the outflowing gas/solid stream may additionally be supplied with gas in the manner described above.

The optional choice of outlet orifices makes it possible to establish a wide metering range and to keep the handling flexible.

If a plurality of outlet orifices 3 are to be provided, in the fluidized-bed apparatus 1, for loading a plurality of reaction spaces 19, the position of said orifices and the mutual position in the bottom 11 of the fluidized-bed apparatus 1 must be taken into account in order to avoid disturbances due to overlapping of the particular entry zones or the effect of the fluidized bed limits. In the case of series arrangement, the mutual spacing a of the outlet orifices 3 correspond approximately to the distance from the outlet orifices 3 to the lateral limits of the fluidized-bed apparatus 1. In the case of fluidized-bed apparatuses having circular bottoms, the majority of the outlet orifices 3 should preferably be present approximately in the center of the bottom, and the mutual spacing of the outlet orifices should be at least equal to their diameter. However, if a noncentral arrangement of such a majority of outlet orifices is desired, a sufficient distance should be maintained from that edge of the fluidized-bed apparatus which borders the fluidized bed 2, as explained above.

With reference to FIG. 2, there is a gas flow controller 100 which is responsive to signals outputted by the logic controller 34 to provide the functions of pulsating gas flows with a desired pulsation amplitude and pulsation frequency by control of the valves 13 and 13'. Included within the controller 100 is an oscillator 101 which establishes the pulsation frequency and amplitude modulator 102 by which the oscillator output is controlled for adjusting the amount of valve opening in each of the valves 13 and 13'. The oscillator may be disabled to provide a steady state output (no oscillation), and is adjustable to provide for the desired frequency. The modulator has an adjustable amplitude control for selecting the amount of a valve spring. Pulsations in gas fed via the nozzle 6 produce an oscillation of the fluidizing bottom.

What is claimed is:

1. A method for dosing a particulate phase within a free-flowing two phase flow, consisting of a gas phase and a particulate phase, said method including he steps of feeding said particulate phase and said gas phase into a fluidizing apparatus with a fluidizing bottom and at least one outlet orifice with a discharge cross section and a discharge diameter;

homogenizing said two phases in a fluidized bed with a vertical bed height and a horizontal bed cross section above said fluidizing bottom by a gas flow passing through said fluidizing bottom;

discharging said two phase flow through said at least one outlet orifice into at least one discharge pipe with a discharge direction leading away from said at least one outlet orifice;

controlling a constant mass flow of said particulate phase and a constant homogeneity of said two phase flow by injecting gas through nozzle means;

wherein said mass flow is measurable based on a pressure difference between at least one first location within said fluidized bed and one second location within at least one discharge pipe; and said nozzle means is located within said at least one discharge pipe, and said step of injecting is accomplished by injecting the gas at a third location close to the outlet orifice into said at least one discharge pipe via said nozzle means, and said second location being located between said outlet orifice and said third location.

2. A method as claimed in claim 1, wherein said step of controlling is executed within time intervals shorter then 100 msec.

3. A method as claimed in claim 1, wherein said vertical bed height is at least twice as big as said discharge diameter.

4. A method as claimed in claim 3, wherein said vertical bed height is about three times as big as said discharge diameter.

5. A method; as claimed in claim 3, wherein said vertical bed height is about ten to fifty times as big as said discharge diameter.

6. A method as claimed in claim 1, wherein said fluidizing bottom is porous.

7. A method as claimed in claim 1, wherein said gas flow is pulsating with a pulsation frequency and a pulsation amplitude.

8. A method as claimed in claim 7, wherein said pulsation frequency is adjustable.

9. A method as claimed in claim 7, wherein said pulsation amplitude is adjustable.

10. A method as claimed in claim 1, wherein said fluidizing bottom is oscillating with an oscillation frequency and an oscillation amplitude.

11. A method as claimed in claim 10, wherein said oscillation frequency is adjustable.

12. A method as claimed in claim 10, wherein said oscillation amplitude is adjustable.

13. A method as claimed in claim 1, wherein said fluidized bed is kept at a low expansion by controlling the flow rate of said gas flow.

14. A method as claimed in claim 13, wherein the gas flow rate for said low expansion is less than a flow rate which loosens said particulate phase, loosening of said particulate phase occurring at an incipient fluidization velocity of said gas flow.

15. A method as claimed in claim 14, wherein said gas flow has a velocity in the range of 0.95 to 2 times said incipient fluidization velocity.

16. A method as claimed in claim 1, further comprising a step of injecting gas into said fluidized bed immediately adjacent to said outlet orifice.

17. A method as claimed in claim 1, wherein said nozzle means comprises a first injection device, the method further comprising the step of supplying gas from a common pneumatic supply line to at least said first and at least one second injection device, said first injection device is injecting gas close to said at least one outlet orifice into said at least one discharge pipe and said second injection device is injecting gas into said fluidized bed immediately adjacent to said at least one outlet orifice.

18. A method as claimed in claim 1, wherein said gas injecting step comprises a step of supplying said at least one discharge pipe through at least one injection nozzle with conveying gas for building a gas cushion around said two phase flow.

19. A method as claimed in claim 18, wherein said conveying gas is supplyed through a ring shaped injection nozzle.

20. A method as claimed in claim 18, wherein said conveying gas is injected in said discharge direction.

21. A method as claimed in claim 1, further comprising the steps of:

measuring an actual value of said mass flow of said particulate phase through said at least one discharge pipe, supplying a desired value for said mass flow, and comparing said actual value with said desired value.

22. A method as claimed in claim 21, wherein said mass flow is measured by measuring said pressure difference between at least one first location within said fluidized bed adjacent said fluidizing bottom and at least one second location within said at least one discharge pipe.

23. A method for dosing a particulate phase within a free-flowing two phase flow, consisting of a gas phase and a particulate phase, said method including the steps of feeding said particulate phase and said gas phase into a fluidizing apparatus with a fluidizing bottom and at least one outlet orifice with a discharge cross section and a discharge diameter;

homogenizing said two phases in a fluidized bed with a vertical bed height and a horizontal bed cross section above said fluidizing bottom by a gas flow passing through said fluidizing bottom;

discharging said two phase flow through said at least one outlet orifice into at least one discharge pipe with a discharge direction leading away from said at least one outlet orifice;

controlling of a constant mass flow of said particulate phase and a constant homogeneity of said two phase flow by injecting gas through nozzle means;

wherein said mass flow is measured by measuring a pressure difference between at least a first location within said fluidized bed adjacent said fluidizing bottom and at least one second location within said at least one discharge pipe; and the method further comprises a step of fluidizing and homogenizing said two phase flow within said discharge pipe by injecting gas at a third location adjacent to said at least one outlet orifice into said at least one discharge pipe, said second location being located between said outlet orifice and said third location.

24. A method as claimed in claim 1, wherein said step of controlling a constant mass flow includes the step of controlling said feeding of said particulate phase.

25. A method as claimed in claim 1, wherein said step of controlling a constant mass flow includes the step of controlling a pressure above said fluidizing bed.

26. A method as claimed in claim 1, wherein said step of controlling a constant mass flow includes the step of fluidizing and homogenizing said two phase flow within said at least one discharge pipe by injecting gas close to the outlet.

27. A method as claimed in claim 1, wherein said step of controlling a constant mass flow includes the step of injecting gas into said fluidized be immediately adjacent to said outlet orifice.

* * * * *